(12) United States Patent
Fujisawa

(10) Patent No.: US 12,288,184 B2
(45) Date of Patent: Apr. 29, 2025

(54) LOCKER MANAGEMENT SYSTEM

(71) Applicant: Kazunori Fujisawa, Tokyo (JP)

(72) Inventor: Kazunori Fujisawa, Tokyo (JP)

(*) Notice: Subject to any disclaimer, the term of this patent is extended or adjusted under 35 U.S.C. 154(b) by 0 days.

(21) Appl. No.: 17/074,530

(22) Filed: Oct. 19, 2020

(65) Prior Publication Data

US 2021/0287167 A1    Sep. 16, 2021

(30) Foreign Application Priority Data

Sep. 11, 2019   (JP) ................. 2019-165408

(51) Int. Cl.
*G06Q 10/08* (2024.01)
*G06Q 10/0836* (2023.01)
*G07C 9/00* (2020.01)

(52) U.S. Cl.
CPC ..... *G06Q 10/0836* (2013.01); *G07C 9/00309* (2013.01); *G07C 2009/00436* (2013.01)

(58) Field of Classification Search
CPC .................. G07C 9/00309; G07C 2009/00436
See application file for complete search history.

(56) References Cited

U.S. PATENT DOCUMENTS

| | | | | |
|---|---|---|---|---|
| 7,962,422 B1* | 6/2011 | Melechko | ............ | G06Q 20/202 705/333 |
| 2001/0042024 A1* | 11/2001 | Rogers | ............... | G06Q 30/0635 705/26.81 |
| 2002/0111914 A1* | 8/2002 | Terada | ............... | G06Q 30/02 705/60 |
| 2003/0040980 A1* | 2/2003 | Nakajima | ............... | G07F 17/13 705/26.8 |

(Continued)

FOREIGN PATENT DOCUMENTS

| | | |
|---|---|---|
| JP | H10-162065 A | 6/1998 |
| JP | 2002-140632 A | 5/2002 |
| JP | 2002-288562 A | 10/2002 |

OTHER PUBLICATIONS

Zenezini et al., The collection-and-delivery points implementation process from the courier, express and parcel operator's perspective, IFAC PapersOnLine 51-11 (2018), pp. 594-599 (Year: 2018).*

*Primary Examiner* — Daniel Vetter
*Assistant Examiner* — Christopher Gomez
(74) *Attorney, Agent, or Firm* — Muncy, Geissler, Olds & Lowe, P.C.

(57) ABSTRACT

A locker management system including a management server that manages status of shipping of items and status of keeping each of the items at the locker spots. The locker spot is equipped with an electronically controlled locker and a spot terminal, and the management server receives selection and designation of the locker spot to keep the item and designation of predetermined length of time for which the item is kept at the locker spot, and upon delivery of the item to the locker spot, notifies a customer terminal of a locker number. When a customer visits the locker spot and reads an identification code attached to the locker, and transmits this code and the customer ID to the management server, the management server performs necessary checking processing. If the answer of the checking processing is positive, the management server transmits a signal for unlocking a locker to the locker.

6 Claims, 15 Drawing Sheets

(56) References Cited

U.S. PATENT DOCUMENTS

| | | | |
|---|---|---|---|
| 2014/0330603 A1* | 11/2014 | Corder | G07F 17/13 |
| | | | 705/7.12 |
| 2016/0132659 A1* | 5/2016 | Vaz | G16H 20/13 |
| | | | 700/242 |
| 2017/0351975 A1* | 12/2017 | Webb | G06Q 10/02 |
| 2022/0028194 A1* | 1/2022 | Grzenda | E05B 67/22 |

* cited by examiner

LOCKER MANAGEMENT SYSTEM

BACKGROUND OF THE INVENTION

Field of the Invention

The present invention relates to a locker management system and the like for widely delivering goods and items via lockers, more specifically to a locker management system for smoothly delivering items bought online, for example.

Description of the Related Art

Conventionally, locker management system technology that uses delivery lockers, electronically controlled lockers, and the like to deliver goods and items has been provided.

For instance, a system has been proposed for smoothly delivering items bought, for example, online by buyers from distributors via a box (Japanese Patent Laid-Open No. 10-162065).

In particular, Japanese Patent Laid-Open No. 10-162065 discloses a delivery management system in which clients, a distribution server that manages item delivery according to requests from the clients, and an intermediate store server that manages intermediate processing of items to deliver are connected via a communication network, the delivery management system including means for determining an item delivery date and time and an intermediate store server to use between the distribution server and a client, and means for notifying, from the intermediate store server, to at least one of the distribution server and the client of item receiving/shipping to/from the intermediate store; and the intermediate store server includes multiple boxes, a box opening/closing device for checking door closing for each box and for locking and unlocking, and means that have a shared delivery locker provided with a box monitoring device for checking the presence of an object in the box and determining item receiving/shipping by using the box opening/closing device and the box monitoring device.

A distribution system that can process item delivery using stations through a series of procedures has also been proposed (Japanese Patent Laid-Open No. 2002-140632).

In particular, Japanese Patent Laid-Open No. 2002-140632 discloses a distribution system using stations and including a server, a virtual store built on the server and posting item information, and multiple customer terminals that can be connected to the server. Each customer terminal connects to the virtual store. After a customer selects an item posted in the virtual store, the authentication data related to the customer is transmitted to the server. The server checks the authentication data and then places an order for the item. The slip data related to the ordered item transmitted to the customer terminal from the server is distributed. Each station where the distribution system is installed is equipped with a reception device including a storage unit for storing the slip data transmitted from the server, an input unit for inputting delivery data transmitted from the server to the customer, a check unit for verifying the delivery data against the slip data stored in the storage unit, and a payment unit for a making payment for the item ordered by the customer after checking the verification. A locker provided with a large number of storage rooms for storing the item is installed in the vicinity of the reception device. When receiving the item, the customer checks the matching between the authentication data stored in the storage unit of the reception device and the delivery data input by the customer and then performs a series of procedures up to the receipt of the ordered item.

A system has been also proposed in which items ordered via a network are received at lockers, and items can be purchased at the store desired by the customer, delivered via the locker desired by the customer, and on the reception date desired by the customer, thereby enabling the purchase of an item that is optimum for the customer (Japanese Patent Laid-Open No. 2002-288562).

In particular, Japanese Patent Laid-Open No. 2002-288562 discloses an order taking and sales system that mediates item delivery to a customer via an item delivery locker, the order taking and sales system including means for allowing a customer terminal to designate an item delivery locker, means for designating the pick-up date of the purchase desired item, means for reserving a locker room of the item delivery locker for the pick-up date, and means for notifying the customer terminal of the reserved locker room and means for unlocking the key device.

However, in the conventional locker management system, the delivery box and the delivery locker cannot be used unless they are actually available. In other words, there is room for further improvement in devising from the viewpoint of improving the turnover rate of the lockers used. Considering the locker occupancy rate and the cost of the locker installation area, the locker turnover rate is preferably increased as much as possible.

Therefore, for example, as described in Japanese Patent Laid-Open No. 2002-288562, when the customer does not come pick up the item even after the pick-up date has passed, rather than simply contacting the customer to pick up the item, flexible management is required.

Besides, it is required to more flexibly adjust and manage the delivery time and the like between the delivery spot and the user (customer). For instance, it is desirable to build an operation system in which the delivery spot is not a dedicated spot but widely accepts participation from general stores.

SUMMARY OF THE INVENTION

A locker management system according to one embodiment of the present invention includes: a management server that manages a status of shipping of items from one or more distribution centers to a plurality of locker spots, and a status of keeping each of the items at each of the locker spots for a predetermined length of time, wherein the locker spot is equipped with an electronically controlled locker for keeping the item, and a spot terminal, and the management server receives selection and designation of the locker spot to keep the item and designation of the predetermined length of time for which the item is kept at the locker spot from a customer terminal, upon delivery of the item to the electronically controlled locker of the locker spot selected and designated by the customer terminal, notifies the customer terminal of a locker number in the electronically controlled locker keeping the item, and manages the locker number, a customer ID of the customer, and the predetermined length of time, when a customer using the customer terminal visits the locker spot during the managed predetermined length of time, and in order to unlock the locker corresponding to the locker number using the customer terminal, reads an identification code attached to the locker and transmits the identification code and the customer ID of the customer to the management server, performs processing of checking the locker number notified to the customer terminal for takeout of the item kept in the locker corresponding to the locker number in the electronically controlled locker, and a customer ID corresponding to the locker number managed by the management server against the locker number transmitted from the customer terminal, and the customer ID of the customer, and if the answer of the checking processing is positive, transmits a signal for unlocking a locker corresponding to the locker number from the management server to the locker, and when the customer using the customer terminal visits the locker spot during the managed predetermined length of time and does not unlock the locker corresponding to the locker number using the customer terminal, determines that the customer has not visited the locker spot during the managed predetermined length of time, and temporarily takes out the item kept in the locker corresponding to the locker number in the electronically controlled locker, or, if extension for continuous keeping is possible, displays a stockable time of when the extension is made, and makes an inquiry at the spot terminal about whether the item should be continuously kept in the locker.

Further, the management server is a spot terminal installed at the locker spot.

The locker management system according to one embodiment of the present invention is advantageous in that the turnover rates of delivery boxes and delivery lockers are increased, the shortage of lockers is solved, and item delivery to the user at the delivery spot where general stores can also widely participate can be more flexibly adjusted.

DETAILED DESCRIPTION OF THE PREFERRED EMBODIMENTS

A locker management system according to one embodiment of the present invention will be described in detail below with reference to the accompanying drawings.

Figure 1:
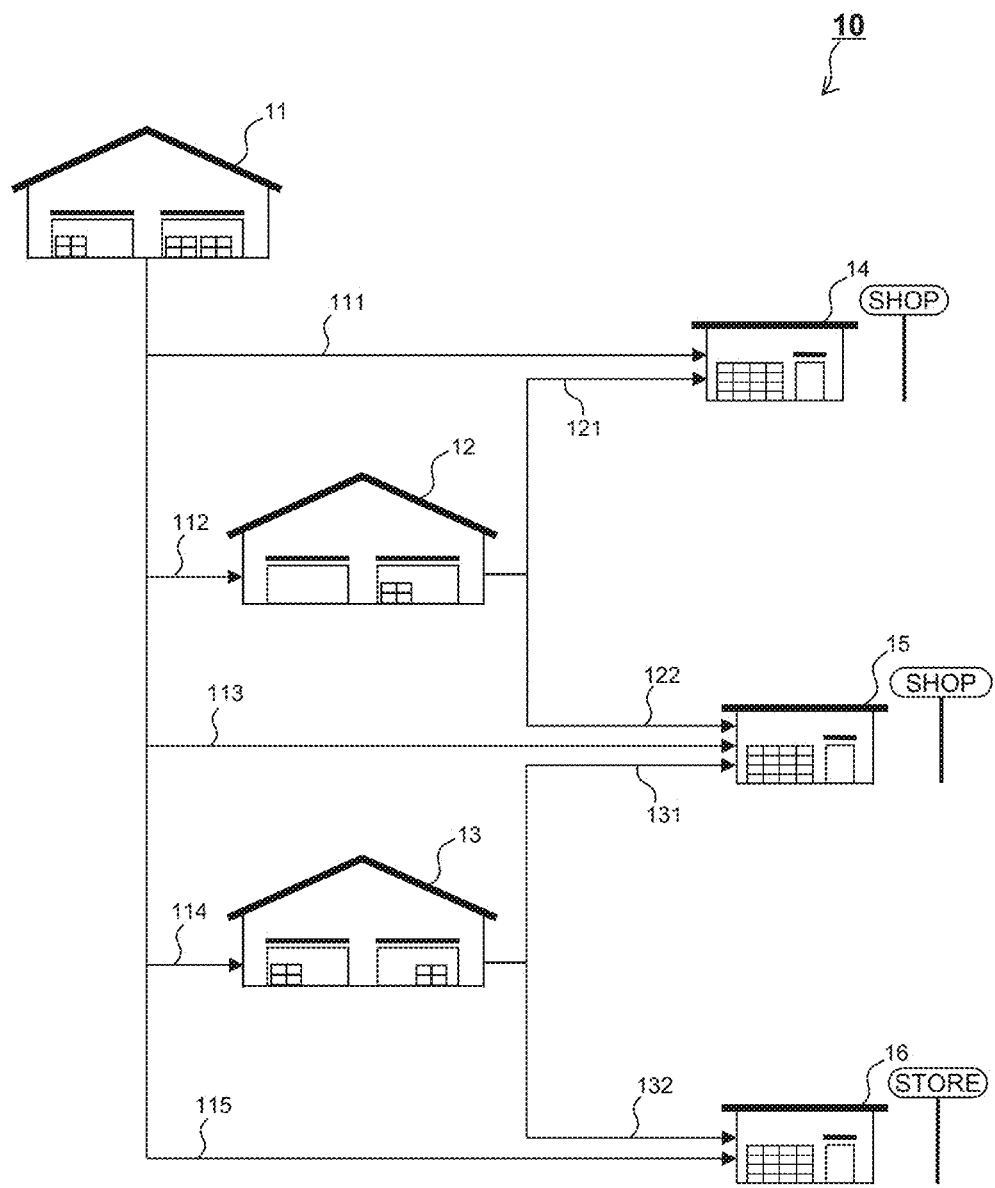
FIG. 1 is an explanatory diagram for explaining facilities, distribution channels, and the like related to a locker management system according to one embodiment of the present invention.

FIG. 1 schematically shows facilities, distribution channels, and the like related to a locker management system according to one embodiment of the present invention. In the drawing, the locker management system 10 viewed from the facilities and distribution channels constitutes a distribution network for delivering items and the like that roughly includes distribution centers 11 to 13 and locker spots 14 to 16.

The locker spots 14 to 16 in one embodiment of the present invention should not necessarily be dedicated spots for item delivery, and may be general stores (for example, shops, stores, restaurants, sales offices, and offices) with locker equipment for item delivery in a part of the building. The term "locker spot" hereinafter refers to not only a spot dedicated to item delivery but also such a general store.

The number of distribution centers 11 to 13 and locker spots 14 to 16 is not limited to these numbers, and may be any number of centers and spots. Hereinafter, for easy understanding of the present invention, the model shown in FIG. 1 will be described for convenience.

[Basic Concept of Present Invention: Distribution Centers and Locker Spots]

A feature of the facilities in the locker management system according to one embodiment of the present invention is that at least these two types of facilities are included. The basic concept is that a locker spot according to one embodiment of the present invention as a pickup spot with an electronically controlled locker for temporarily keeping items and packages is provided besides the conventional distribution center as a distribution spot.

In other words, the locker spot is a pick-up spot unique to the present invention provided with a locker for delivering items and the like from distribution centers to customers and the like, and the distribution network provided with this locker spot constitutes one of the basic concepts of the present invention.

Also, as shown in FIG. 1, distribution centers may have different functions. For instance, in the drawing, the distribution center 12 has the function of delivering items and the like to the locker spots 14 and 15 through the channels 121 and 122, and the distribution center 13 has the function of delivering items and the like to the locker spots 15 and 16 through the channels 131 and 132, whereas the distribution center 11 has the function of delivering items and the like to the other distribution centers 12 and 13 through the channels 112 and 114, and also to the locker spots 14, 15, and 16 through the channels 111, 113, and 115. For instance, items and the like are usually supplied to the locker spot 14 from the geographically nearby distribution center 12, but when the distribution center 12 is out of stock, the items and the like are supplied from the distribution center 11 to the locker spot 14 in some cases.

Although not shown in FIG. 1, a channel for delivering items and the like directly from the distribution centers 11 to 13 to the customer's homes may be provided (not shown in the drawings in the present invention).

[Distribution Management]

The time required for delivery or shipping (estimated time) and the number of items and the like in stock at each spot are managed by the system, although this is not necessarily the case in the present invention. Although an example of the overall configuration of the locker management system according to one embodiment of the present invention will be described later with reference to FIG. 3, for example, the management server in the locker management system according to one embodiment of the present invention is installed in any of the distribution centers or locker spots shown in FIG. 1, or in a company building (not shown in the drawings), and the management server is connected to each center and each spot via information terminals and a network, and the management server can be forced to manage, moment to moment, the item stock and the number of items received and shipped at each spot or the like, and the status of delivery or shipping between spots or to the destination. Furthermore, the delivery time or shipping time between spots or to the destination can be calculated from these actual results and the like, and these information can be sequentially updated and managed.

For this reason, each channel in FIG. 1 is not always the only one channel. For instance, the channel from the distribution center 11 to the locker spot 14 is managed by the system as 111, but one or more other routes can be stored and managed by the management server as an alternative route.

These alternative routes can be adopted as alternatives depending on the traffic at that time, for example, and can be designated depending on the specific delivery facility (spot) or delivery means (delivery vehicle).

[Sales Management]

The locker management system according to one embodiment of the present invention is also capable of sales management of items and the like. The locker management system according to one embodiment of the present invention is also linked with a mail-order (electronic commerce) system (not shown in the drawings) and a store POS cash register, and can manage mail-order sales actual results and store sales actual results for each customer. The following databases (D1) to (D5) as databases for that purpose are included in the management server in one embodiment, and references and update requests can be made from various terminals.

(D1) Customer Management Database

It is a database including registered items related to customers, and personal information, such as customer names, addresses, and telephone numbers, and ancillary information, such as points held and locker spots frequently used, and the like.

(D2) Item Management Database

It is a database including registered entries related to items, and item names, item codes associated with JAN codes, and the like under management.

(D3) Stock Management Database

It is a database for managing item stock for each sales spot (sales area) from which necessary tables are derived and extracted by linking with the item management database as appropriate.

(D4) Warehouse Management Database

A database for managing item stock in warehouses such as distribution centers.

(D5) Sales Management Database A actual results management database related to items sold for each sales spot or store.

[Function of Locker Spot]

A locker spot has the following function in a distribution system including the locker management system according to one embodiment of the present invention (system operation, work by workers, such as staff member at the spot, will be listed together).

(1) Receive items from the distribution center.
(2) Sort and store the items according to delivery time.
(3) Check the locker pick-up time and assign a locker to each item.
(4) Notify the application on the terminal owned by each customer (client) of the assigned locker and its PIN code (in other embodiments, the management server may perform management and control. In this case, the staff member at the spot delivers each item to the box assigned by the management server).
(5) Change the pick-up time according to a request from the client (customer).
(6) Take out the items that were not picked up during the designated time from the locker and store them in a predetermined area, and notify the application on the terminal owned by each client (customer) that the item has been taken out of the locker (send a request for changing the storage spot or re-designating the pick-up time) (the management server may perform some or all management or processing).
(7) In (6), if the storage locker can be used continuously, the client (customer) terminal application is notified that the item will be continuously kept (the management server may perform some or all management or processing).

Of (1) to (7), at least the check (decision) process and/or the locker assignment process of (3), the PIN code generation process and notification of (4), and other processes and notifications, for example, may be automatically performed by the system (the spot terminal 202 and the management server 31).

In one embodiment of the present invention, delivery from the distribution center to the locker spot is carried out as a task of the same service provider, and is not outsourced to another courier or the like. For instance, a target item is delivered several times a day by, for example, the company's own mail in the service provider.

Figure 2:
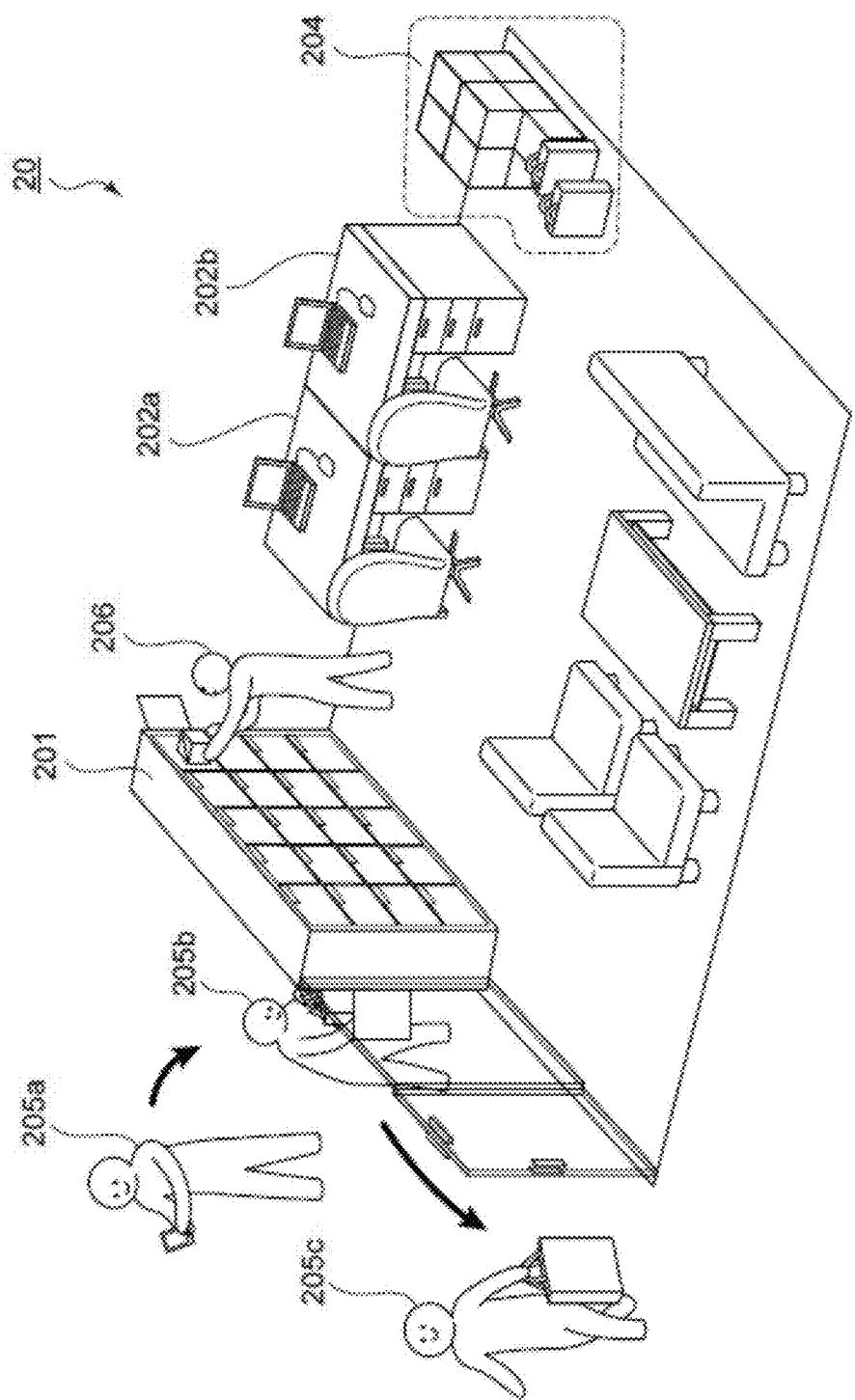
FIG. 2 is an explanatory diagram for explaining an example locker spot (spot in a general store) related to a locker management system according to one embodiment of the present invention.

FIG. 2 shows a locker spot related to a locker management system according to one embodiment of the present invention. Here, a general store provided with a locker facility (electronically controlled locker) for item delivery in a part of the building will be described as an example.

As shown in FIG. 2, the locker spot 20 includes an electronically controlled locker 201 having, for example, doors that can be opened and closed from the outside and the inside of the spot building, spot (staff) terminals 202a and 202b installed inside the spot building, and an item keeping area 204. The item keeping area 204 can also be used as a sorting area, although this is not necessarily the case in the present invention.

Note that the electronically controlled locker 201 is an example of equipment for temporarily storing items, packages, and the like, and alternative storage equipment can be adopted without departing from the spirit of the present invention.

Although the spot (staff) terminals 202a and 202b are expressed as PCs on a desk in FIG. 2, this is not necessarily the case in the present invention, and they can be the information terminals, such as a tablets or smartphones, that the spot staff member 206 can carry.

With the locker management system according to one embodiment of the present invention, the user (customer) 205a who purchased an item using the mail-order service provided through the user terminal or the like can pick up the purchased item at a locker spot near the closest station or his/her home without going to the sales store. In this case, in one embodiment, the user (customer) 205b can pick up the purchased item that was delivered in advance to the locker 201 at the locker spot according to an instruction transmitted to the user terminal. In one embodiment, item delivery to the locker 201 is performed by the staff member 206. The instructions sent to the user terminal and the procedure of unlocking the designated locker will be described later.

In one embodiment of the present invention, the staff member 206 is in charge of not only item delivery but also other tasks at the general store (primary tasks at the store) except that he/she delivers items to the locker 201, takes out the items from the locker 201, and performs other communication related to item delivery.

The user (customer) 205c who successfully took out the purchased item from the locker 201 takes the item home.

Meanwhile, the user cannot always take out the purchased item from the locker 201. In one embodiment, upon lapse of a predetermine length of time after the purchased item is delivered to a predetermined box of the locker 201, notification is sent to the terminal of the staff member 206 from the server and the staff member 206 takes out the item. The taken out item is safely kept in another area (for example, the item keeping area 204) inside the spot building. This fact can also be notified to the user's terminal.

Upon reception of the notification, the user can designate the time (or time slot) of item delivery via the locker 201 again, and the designated time (or time slot) is notified to the terminal of the staff member 206 (these data exchanges are managed by the server as needed). The staff member 206 redelivers the item to the locker 201 at a predetermined time so that the user (customer) can pick up the item via the locker 201 at the re-designated time (or time slot) (at this time, the server may send a reminder to the terminal of the staff member 206).

Alternatively, in one embodiment of the present invention, if the item can be continuously kept in the box even upon the lapse of a certain length of time after the item was delivered to the predetermined box of the locker 201, this fact is notified to the user's terminal and the item will not be taken out. These data exchanges are managed by the server as needed.

Figure 3:
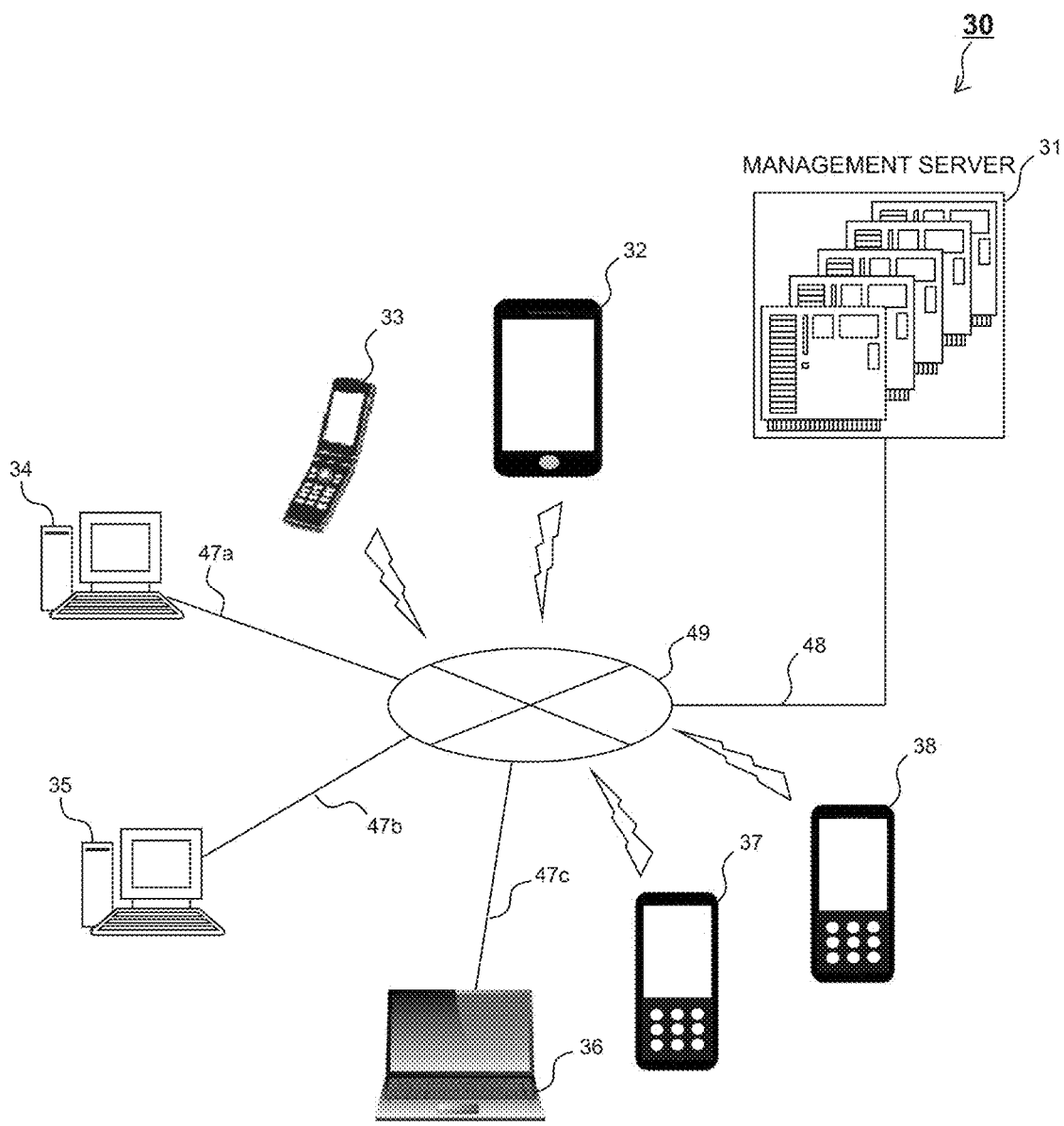
FIG. 3 is an explanatory diagram for explaining an example of the entire configuration of a locker management system according to one embodiment of the present invention.

FIG. 3 shows an example of the entire configuration of a locker management system according to one embodiment of the present invention.

As shown in FIG. 3, the locker management system 30 according to one embodiment includes the management server 31 and various information processing devices used by users (customers), delivery staff, locker spot staff, and other people (the drawing illustrates a portable device or tablet device 32, a mobile phone 33, PCs 34 to 36, and POS terminals 37 to 38 which will be hereinafter be collectively called "various terminals" or simply "terminals"). As shown in FIG. 3, the management server 31 and various terminals are connected to each other so that they can communicate with each other via a private line or public line such as the Internet (47a to 49 as wired lines). The lines may be wired or wireless. In the case where they are wireless, the portable device or tablet device 32, the mobile phone 33, and the POS terminals 37 and 38 wirelessly access to the Internet 49 via a base station or access point not shown in the drawing, and are connected to the management server 31 via the line 48 so that they can interactively communicate. In one embodiment of the present invention, the POS terminals 37 and 38 do not always constitute the essence of the present invention (which means that they are additional components).

Here, the access point is a wireless device for connecting wireless terminals, such as PCs and smartphones, interactively or to another network. It is typically a device that operates with the communication protocols of the first layer (physical layer) and the second layer (data link layer) in the OSI reference model.

Note that many user mobile phones and portable devices or tablets at the time of filing this application have processing capabilities (for example, communication processing speed and image processing capacity) equivalent to those of personal computers (PCs), and should be called compact computers.

In addition, programs or software necessary for implementing the present invention are usually installed or stored in the HDD or SSD in the storage unit of PCs or portable devices. When a program or software is executed, all or part of it is read as software modules in the memory in the storage unit as necessary and is subjected to operations in the CPU.

Alternatively, a browser-based computer or portable device can be adopted. In this case, a program is distributed from another server or computer to terminals as needed, and the browser on each terminal executes this program.

In addition, a PC can be basically used for the hardware configuration of the management server 31 (this will be described later with reference to FIG. 4 just in case). The management server 31 may have a configuration suitable for processing a large amount of data by operating a plurality of PCs (for example, several tens to several tens of thousands of PCs) in parallel to increase its hardware performance as necessary, although this is not necessarily the case in the present invention.

Meanwhile, depending on the system configuration, some of the information processing terminals (for example, the spot terminal 202) may have part of all of the functions of the management server 31.

Figure 4:
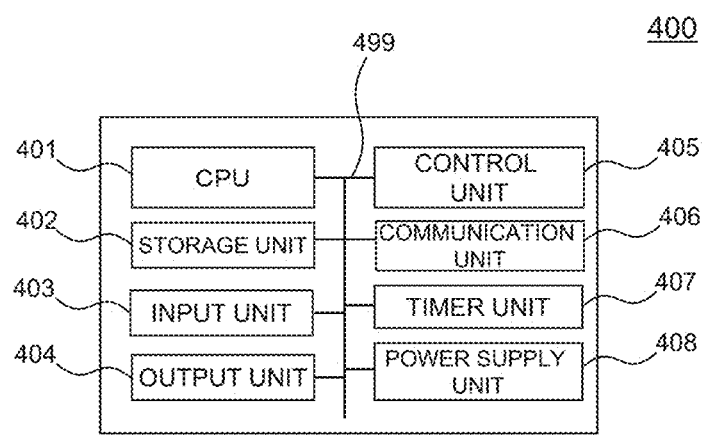
FIG. 4 is an explanatory diagram for explaining a functional block configuration of a management server related to a locker management system according to one embodiment of the present invention.

FIG. 4 is a function block diagram of the management server 31 in a locker management system according to one embodiment of the present invention. The operation of the management server is implemented by, for example, the individual operations of the hardware devices described below and their linked operations with the software.

In FIG. 4, management server 400 as an entire hardware block is roughly classified into a CPU 401 for performing various types of comparison/arithmetic processing, a storage unit 402, such as a RAM, a ROM, or a flash memory, an input unit 403, such as a keyboard or a pointing device, an output unit 404, such as a display or a speaker, a control unit 405 for controlling various signals, a (wireless or wired) communication (interface) unit 406, a timer unit 407 for measuring time or the like, and a power supply unit 408.

These modules are connected via a communication bus and a power supply line as needed and appropriate (in FIG. 4, for convenience, the lines are collectively shown as a connection 499 in which the lines are appropriately separated).

In addition, programs or software which are executed in the management server 400 and are necessary for implementing the present invention are usually installed or stored in a hard disk, a solid state drive (SSD), a flash memory, or the like constituting the storage unit 402. When a program or software is executed, all or part of its software module is read in the memory in the storage unit 402 as necessary and is subjected to arithmetic operations in the CPU 401.

Note that the arithmetic operations should not necessarily be performed in the central processing unit, such as the CPU 401, and an auxiliary arithmetic unit such as a digital signal processor (DSP) (not shown in the drawing) can also be used.

Figure 5:
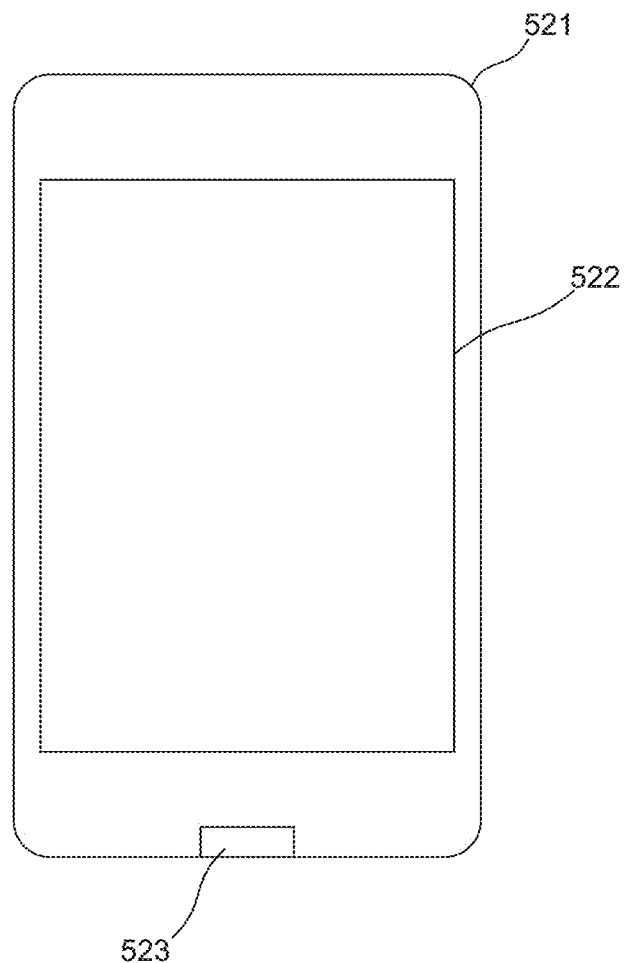
FIG. 5 is an explanatory diagram for explaining an example of the appearance of an information processing device (user terminal) related to a locker management system according to one embodiment of the present invention.

FIG. 5 shows the appearance of the tablet device 52 as an information processing device in a locker management system according to one embodiment of the present invention. In FIG. 5, the information processing device (tablet device) 52 includes a housing 521, a display 522, and a hardware button 523 provided in a lower central portion of the housing 521. The display 522 typically consists of a liquid crystal display (LCD) or the like, and can display various information such as characters, still images, and videos. Menu buttons or a software keyboard is also displayed on the display 522 and touching this with a finger or a touch pen (not shown in the drawing) can give an instruction (command) to the tablet device 52. In this respect, the hardware button 523 is not an essential component but is mounted as a button having a certain function, for convenience of description of the present invention. Naturally, these hardware buttons 523 can be replaced by menu buttons displayed on a part of the display 522.

The display 522 includes a multi-touch input panel, and touch input position coordinates on the touch input panel are transmitted to a processing system (CPU) of the tablet device 52 via an input device interface (not shown in the drawing) and processed. The multi-touch input panel is configured to sense a plurality of touch points on the panel at the same time. This detection (sensor) can be implemented by various methods and is not necessarily a contact sensor, and can extract a designated point on the panel using an optical sensor, for example. Aside from that, the sensor can be not only a contact sensor or an optical sensor but a capacitance sensor that senses a contact with human skin.

Although not shown in FIG. 5, the tablet device 52 can also include a microphone or speaker. In this case, the user's voice or the like picked up from the microphone can be determined and used as an input command. Further, although not shown in FIG. 5, a camera device such as a CMOS can be mounted on, for example, the back surface of the tablet device 52.

Figure 6:
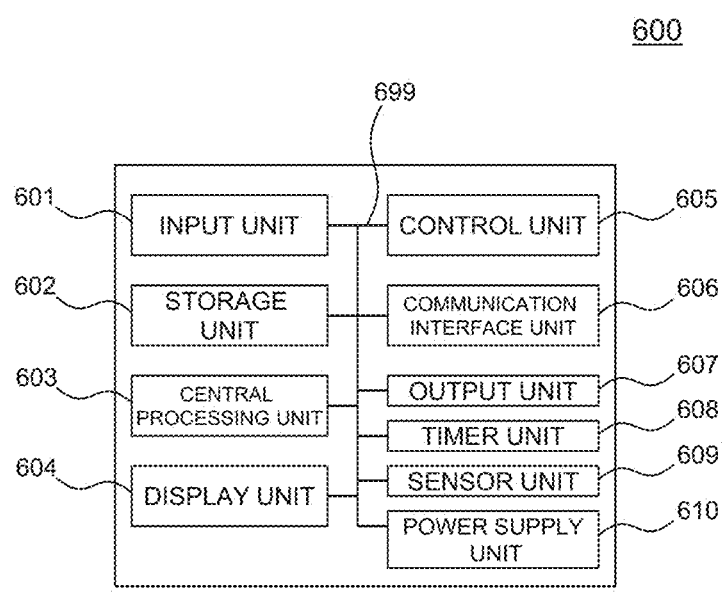
FIG. 6 is an explanatory diagram for explaining a functional block configuration of a piece of hardware constituting an information processing device according to one embodiment of the present invention.

FIG. 6 illustrates a function block diagram of a piece of hardware constituting a tablet device 52 according to one embodiment of the present invention. The operation of the tablet device 52 is implemented by the individual operations of the hardware devices described below and their linked operations with the software.

In FIG. 6, the tablet device 600 as the entire hardware block is roughly classified into the hardware button 523 shown in FIG. 5, a multi-touch input panel provided on the display 522, an input unit 601 consisting of a microphone or the like, a hard disk for storing programs and data, a storage unit 602 consisting of a RAM and/or a ROM, a central processing unit 603 consisting of a CPU that performs various numerical calculations and logical operations according to programs, a display unit 604 consisting of the display 522 or the like, a control unit 605 for controlling chips, electric systems, and the like, a communication interface unit 606 consisting of a slot for a access to the Internet, a port for optical communication, and a communication interface, an output unit 607 such as a speaker, vibrator, or infrared projector, a timer unit 608 for measuring time or the like, a sensor unit 609 consisting of an image sensor such as CMOS, an infrared sensor, or a inertia sensor, and a power supply unit 610 for supplying power to each module in the device. These modules are connected to each other via a communication bus or a power supply line (in FIG. 6, for convenience, the lines are collectively shown as a connection 699 in which the lines are appropriately separated) as needed.

Note that the sensor unit 609 may include a GPS sensor module for identifying the position of the tablet device 600 (32). A signal detected by an image sensor such as a CMOS that constitutes the sensor unit 609, an infrared sensor, or the like can be processed as input information in the input unit 601.

In addition, programs or software which are executed in the tablet device 600 and are necessary for implementing the present invention are usually installed or stored in a hard disk, a solid state drive (SSD), a flash memory, or the like constituting the storage unit 602. When a program or software is executed, all or part of its software module is read in the memory in the storage unit 602 as necessary and is subjected to arithmetic operations in the CPU 603.

Note that the arithmetic operations should not necessarily be performed in the central processing unit 603, such as the CPU, and an auxiliary arithmetic unit such as a digital signal processor (DSP) (not shown in the drawing) can also be used.

Figure 7:
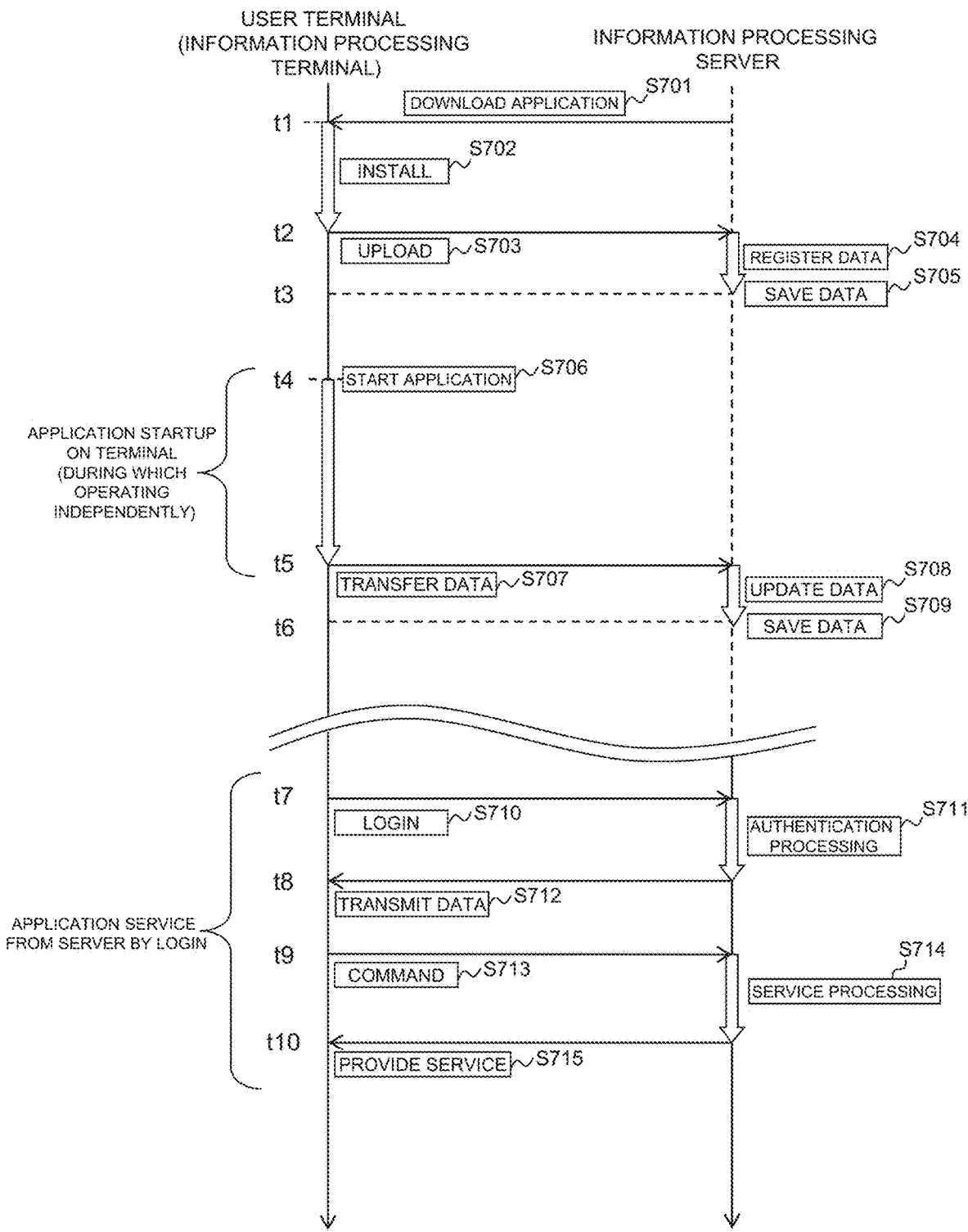
FIG. 7 is an explanatory diagram for explaining an operation processing flow related to a locker management system according to one embodiment of the present invention.

FIG. 7 shows an example of basic operation in the system or device according to one embodiment of the present invention illustrated in FIGS. 1 to 3.

In FIG. 7, the "user terminal" corresponds to each of the devices 32 to 36 in FIG. 3, and the "information processing server" corresponds to the management server 31 in FIG. 3. In FIGS. 7, t1 to t10 show a time-series flow in which operations and processing described later are performed over time.

The operations or processing time (for example, t1) illustrated in the embodiment is illustrated for easy understanding of the concept of the present invention, and the present invention in the embodiment is not limited by the individual time-series relations.

First, at the date and time t1, the user (customer) downloads application software for operating his/her own user terminal as the information processing terminal according to the present invention from the information processing server via the user terminal (Step S701). This application software is client software or application software for processing a part or all of the program according to the present invention. The downloaded application software is then installed on the user terminal (Step S702). At this time, at the time t2, the user terminal can upload the user's e-mail address and the profile information shown in the following table to the information processing server (Step S703) for user registration as necessary, thereby achieving registration management (Step S704).

TABLE 1

| Name (user name) | Membership number (ID) | E-mail address (mobile phone number) | Sex | Age (age-group) | Residence (area etc.) |
| --- | --- | --- | --- | --- | --- |

The aforementioned data entries are stored as user data in the storage device on the information processing server (Step S705). After the time t3, the user (customer) can start the application (the server starts to provide the service to the terminal) by operating the information processing terminal.

Next, the user who has downloaded and installed the application on the user terminal starts the application software at the time t4 (Step S706). From the time t4 to time t5, the user typically receives a service provided from the information processing server to the information processing terminal.

At the time t5, the user once suspends or terminates the application software according to one embodiment of the present invention. At this time, if necessary, the application status information is transferred to the information processing server (Step S707), and the server receives it and updates the status information as the user information on the user (Step S708) and saves it (S709). In FIG. 7, these processing steps are completed by the time t6.

After the application software according to one embodiment of the present invention is installed on the information processing terminal, at least part of it can be made closely executable on the terminal. In this case, Steps S704 and S705 and Steps S708 and S709 can be omitted, and if there is necessary information, it is stored and managed in a memory in the terminal.

Next, FIG. 7 shows a mode in which at least a part of the application software according to one embodiment of the present invention is implemented on the information processing server from the time t7 to the time t10. In this case, the user (customer) performs two typical user terminal operations, login operation and command transmission, and receives necessary data or a service from the information processing server.

For instance, at the time t7 in FIG. 7, if the user logs in to the server via his/her own information processing terminal (Step S710), the information processing server performs necessary authentication processing as appropriate (Step S711), and data for the user to receive the service is transmitted at the time t8 (Step S712). This is, for example, a top menu screen on which commands from the terminal can be received or an application startup screen.

At the time t9, the user sends a certain command from the information processing terminal (Step S713). This command may be menu selection shown on the menu screen, or, on the application start screen, may be a start command for starting the application. Upon reception of this command, the server starts service processing (Step S714). At the time t10, the server provides a service according to the request from the terminal (Step S715).

Although not shown in FIG. 7, the terminal can send commands whatever necessary even after the time t10 (for example, a message sending command or a menu selection command), and the server can receive commands from the terminal whatever necessary and provide a service (for example, transfer the received message to another terminal, analyze the message, and return the result).

Figure 8:
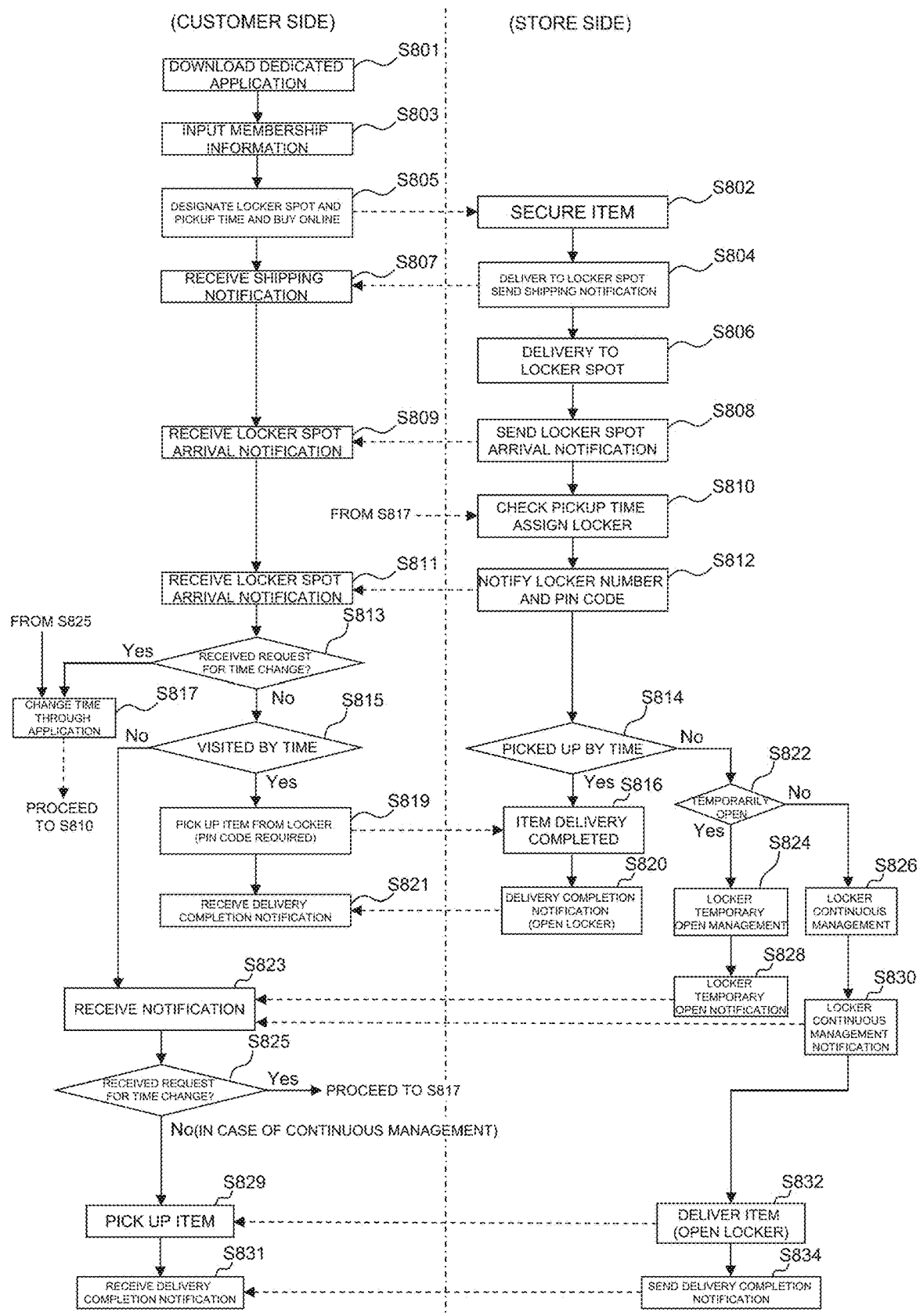
FIG. 8 is an explanatory diagram for explaining an operation processing flow related to a locker management system according to one embodiment of the present invention.

FIG. 8 shows an operation processing flow related to a locker management system according to one embodiment of the present invention. Here, the processing flow will be explained being roughly separated into the processing operation related to the customer (user) who owns the customer terminal (user terminal) and the processing operation related to the store for delivering and keeping items and sends various notifications under the control of the management server and the spot terminal.

Note that there may be one or more management servers and one or more spot terminals. In other words, the management server may consist of a plurality of servers, and there may be a plurality of spot terminals at one spot. The management server may be one of the spot terminals.

In Step S801, the user downloads the dedicated application to his/her own terminal. There are variations of this form as described above with reference to FIG. 7, and it is not always an essential requirement to download a dedicated application. In Step S803, the member information is input by the user's first operation after the application is started (the specific example was already described with reference to FIG. 7).

Figure 9:
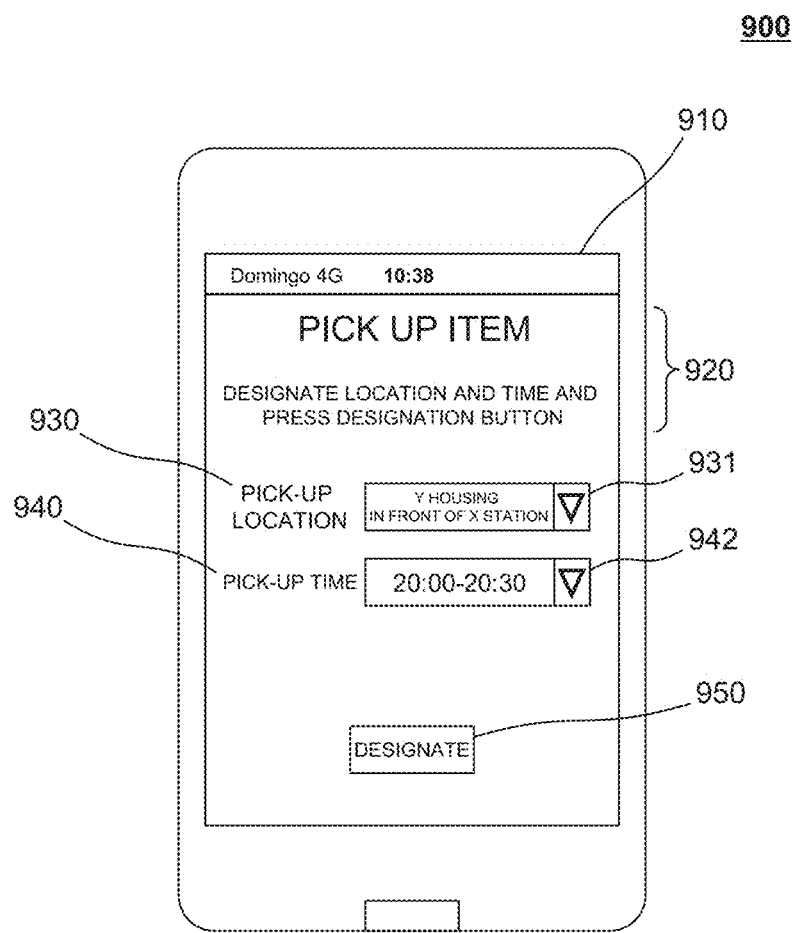
FIG. 9 is an explanatory diagram for explaining an example of presentation on an information processing device (user or customer terminal) related to a locker management system according to one embodiment of the present invention.

The user then proceeds to Step S805, connects to the shopping server or EC website (not shown in the drawing) of the store from his/her own terminal to shop online. Since the item purchase procedure itself on the website can be done using a known method, the detailed explanation will be omitted here. Meanwhile, in this step, as one of the operations unique to one embodiment of the present invention, the locker spot (location) where, when an item is purchased, the item will be delivered and the pick-up time slot (time) can be designated. The screen for designating the item pick-up time and location here is displayed, for example, via the GUI shown in FIG. 9. FIG. 9 is an example of a screen on the user terminal 900. On the display 910 of the terminal 900, an item pick-up guidance message 920, a pick-up location selection field 930, a pick-up location selection box 931, a pick-up time designation field 940, a pick-up time designation box 942, and a designation button 950 are shown, and the user operates the pick-up location selection box 931 and the pick-up time designation box 942 to select the pick-up location (locker spot) and the pick-up time, and confirms by pressing the designation button 950.

Naturally, the aforementioned time slot designation can be not only designation of the time slot from a certain time to a certain time but also designation of the period of time of a certain number of hours from a certain time on a certain date to a certain time on a certain date. In this specification, the designation of the period of time and the designation of the time are not distinguished, and are both referred to as "pick-up time designation", for example.

Returning to Step S805, the confirmed pick-up location (locker spot) and pick-up time are transmitted from the user terminal to the store-side terminal (management server 31 or spot terminal 202).

Note that, in one embodiment of the present invention, payment processing may be performed at this point of time (the details are omitted).

In Step S802, the item purchased by the user in Step S805 is kept at the distribution center or the like, and the pick-up location (locker spot) and pick-up time for the item are received from the user terminal, and preparation for delivery of the item to the pick-up location (locker spot) is performed so that it can be done by the pick-up time.

In Step S804, the delivery from the distribution center to the locker spot is performed, and the user terminal is notified of the shipping of the item (in Step S807, the user terminal receives this notification).

In Step S806, the purchased item delivered from the distribution center arrives at the locker spot, is then temporarily delivered to the locker spot, for example, delivered to the staff member 206. In Step S808, the notification that the purchased item has arrived at the locker spot is transmitted. This notification may be transmitted from the spot terminal 202 or the management server 31. The transmission operation may be ordered by the staff member 206 or may be automatically done at the time of item delivery processing.

In Step S809, the user terminal receives this arrival notification.

In another embodiment of the present invention, the control may be as in Steps S808a to 809b below instead of Steps S806 to S809.

(1) Step S808a: Notify the user terminal that the item has arrived at the locker spot.
(2) Step S808b: Inquire to the user terminal when to be able to come pick up at the locker spot (this may be processed together with the notification in Step S808a).
(3) Step S809a: Receive at the user (terminal) a notification from the store side.
(4) Step S809b (as a notification from the user terminal to the store side): Reply from the user (terminal) to the store side (that, for example, he/she will come pick up immediately, come pick up in 10 minutes, or come pick up in 30 minutes).

In Step S810, the pick-up time designated in Step S805 is checked, and a box in the locker 201 is assigned (locker assignment). These checking processing and assignment processing may be performed by the staff member 206, or automatic assignment may be performed by the spot terminal 202 or the management server 31.

In another embodiment of the present invention, as described referring to Steps S808a to S809b, once when the user will come pick up at the locker spot becomes clear, a box in the locker 201 may be assigned (locker assignment).

Figure 10:
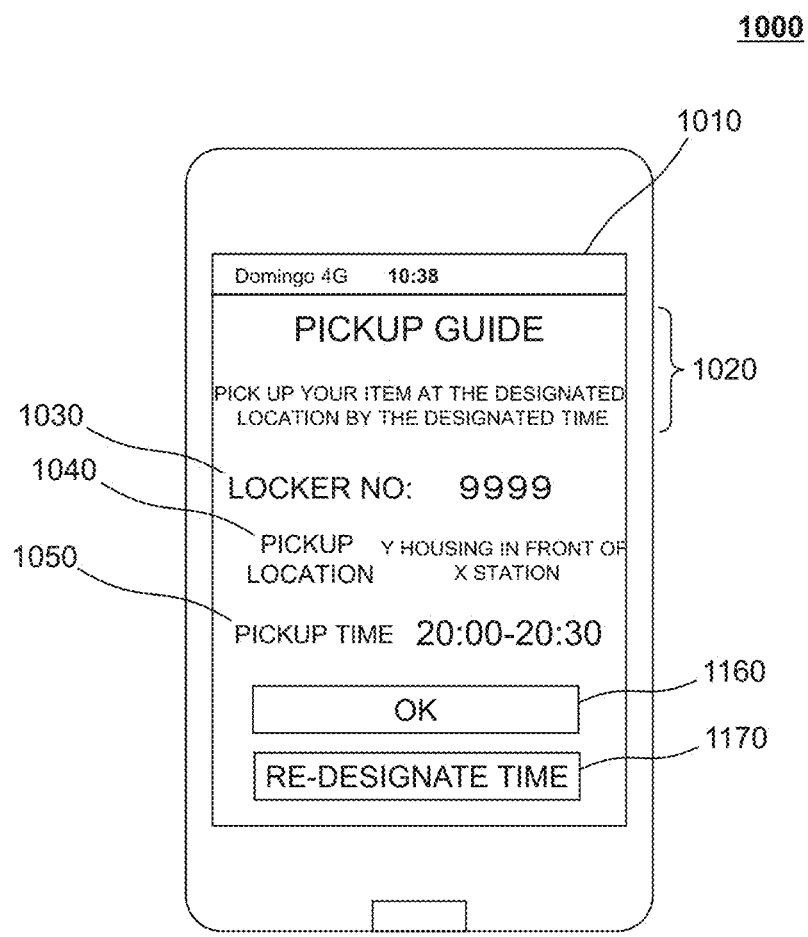
FIG. 10 is an explanatory diagram for explaining another example of presentation on an information processing device (user or customer terminal) related to a locker management system according to one embodiment of the present invention.

In Step S812, the assigned locker number and the PIN code automatically generated before this step are transmitted to the user terminal (in one embodiment, this transmission message is sent when the item is put in the locker corresponding to the assigned locker number. For instance, the staff member notifies the server that the item has been put in the locker, and this is notified from the server terminal to the user terminal or directly from the spot (staff) terminal to the user terminal). In Step S811, the locker number and the PIN code are received at the user terminal. An example of notification here is as shown in FIG. 10. FIG. 10 is an example of a screen of the user terminal 1000, and the display 1010 of the terminal 1000 shows an item pick-up guidance message 1020, a locker number field 1030, a pick-up location field 1040, a pick-up time field 1050, a confirmation button 1160, and a re-designation button 1170. The user presses the confirmation button 1160 if there is no problem with the displayed pick-up place and pick-up time.

Meanwhile, if the pick-up time should be reset, pressing the re-designation button 1170 can cause a transition to a re-designation screen (not shown in the drawing) where the pick-up time can be re-designated.

After Step S812, the process proceeds to Step S814. In one embodiment of the present invention, at some point before Step S814, the purchased item is put in the assigned locker by the staff member 206 or the like (at the same time, a PIN code is also set).

After received at the user terminal, the PIN code is held as an encryption code in the user terminal for being wirelessly checked against a locker or the like, although this is not necessarily the case in the present invention. In this case, it is not necessary to dare to show the PIN code as shown in FIG. 10.

Meanwhile, at the locker, the user himself/herself may enter the PIN code received at the user terminal. In this case, although not shown in FIG. 10, the PIN code (which may be a two-dimensional barcode containing the PIN code or the encrypted code depending on the situation) is additionally displayed.

Here, what is important is that the purchased item is not always put in the assigned locker immediately after Step S812. For instance, if the designated pick-up time is from 18:00 to 20:00 on a certain date in a certain month and it is 24 hours or more before the date and time, if there are other items for which the time slots before that date and time are designated, they will be put in the locker first. It should be theoretically fine to put them in the locker only 5 minutes or 10 minutes before the designated pick-up time. In particular, in Step S812 in one embodiment of the present invention, after the assigned locker number is transmitted to the user terminal, other one or more items are delivered via the locker (boxes), and the item for that user is then put in the assigned locker. In this case, different PIN codes are used for delivery of the items.

Meanwhile, the items for which a predetermined time of length (for example, 15 minutes or 30 minutes) has elapsed from the designated pick-up time can be handled by, for example, safely storing them in another area in the locker spot (e.g., waiting for re-designation by the user).

In Step S813, whether the user has re-designated the pick-up time (change command) in the previous step (Step S811) is determined. If Yes, the process proceeds to Step S817, and the pick-up time is re-designated in the application on the user terminal (change command) and the process returns to Step S810. If No in Step S813, the process proceeds to Step S815.

In Step S814 and/or Step S815, whether the user has visited the locker spot by the designated time (or whether the user has picked up the purchased item by the designated time) is determined.

The determination in Step S814 and Step S815 may be made in at least one of them (for example, when the determination is made by the server or terminal of the store, the result can be notified to the user terminal). Basically, if Yes in Step S814, the answer is Yes in Step S815, and if No in Step S814, the answer is No in Step S815. For easy understanding of the process, the explanation will hereinafter be continued for each step.

In Step S815, if Yes, the process proceeds to Step S819, and the user opens the locker by, for example, wirelessly transmitting the PIN code for the assigned locker to the locker 201 from the user terminal, and picks up the purchased item. At this time, the locker 201 side (store side) can detect that the item has been safely taken out (using an optical sensor, a camera, or the like not shown in the drawing), and therefore can recognize the completion of the item delivery (Step S816). At the store, the spot terminal 202 or the management server 31 issues a delivery completion notification (Step S820). In Step S821, the user terminal receives this completion notification.

Figure 12:
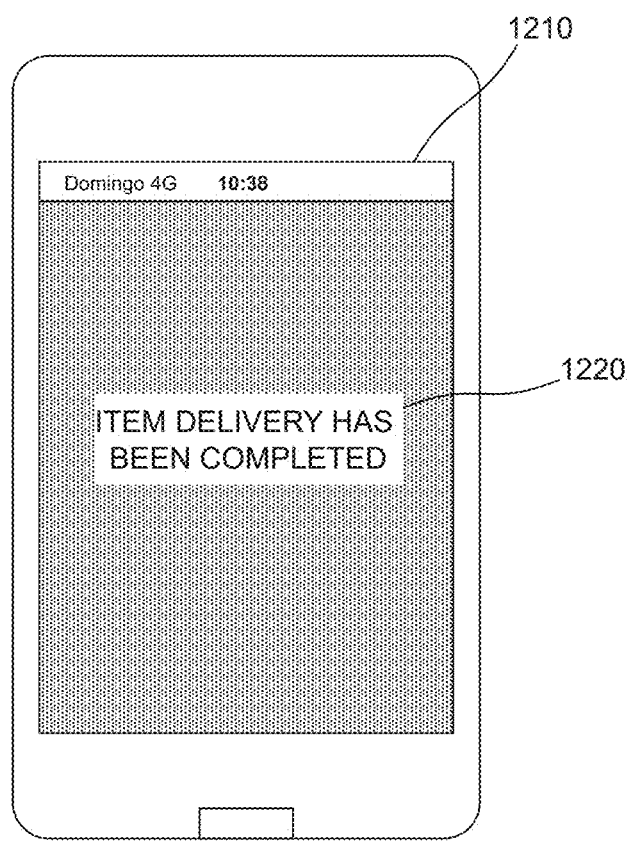
FIG. 12 is an explanatory diagram for explaining another example of presentation on an information processing device (user or customer terminal) related to a locker management system according to one embodiment of the present invention.

FIG. 12 shows an example of a delivery completion notification received at the user terminal according to one embodiment of the present invention. FIG. 12 is an example of a screen of the user terminal 1200, and the item delivery completion message 1220 is shown on the display 1210 of the terminal 1200. Pressing an arbitrary position or an OK button (not shown in the drawing) on the screen can force a transition to another screen (for example, a menu screen not shown in the drawing).

In Step S814, if No, the process proceeds to Step S822, and whether or not to temporarily release the locker is determined. In one embodiment, since the locker (box) is already fully booked, it is determined, for example, that the locker should be temporarily opened, or the locker (box) can be used continuously because no subsequent bookings are expected for the present (or it is empty until XX: XX).

Figure 11A:
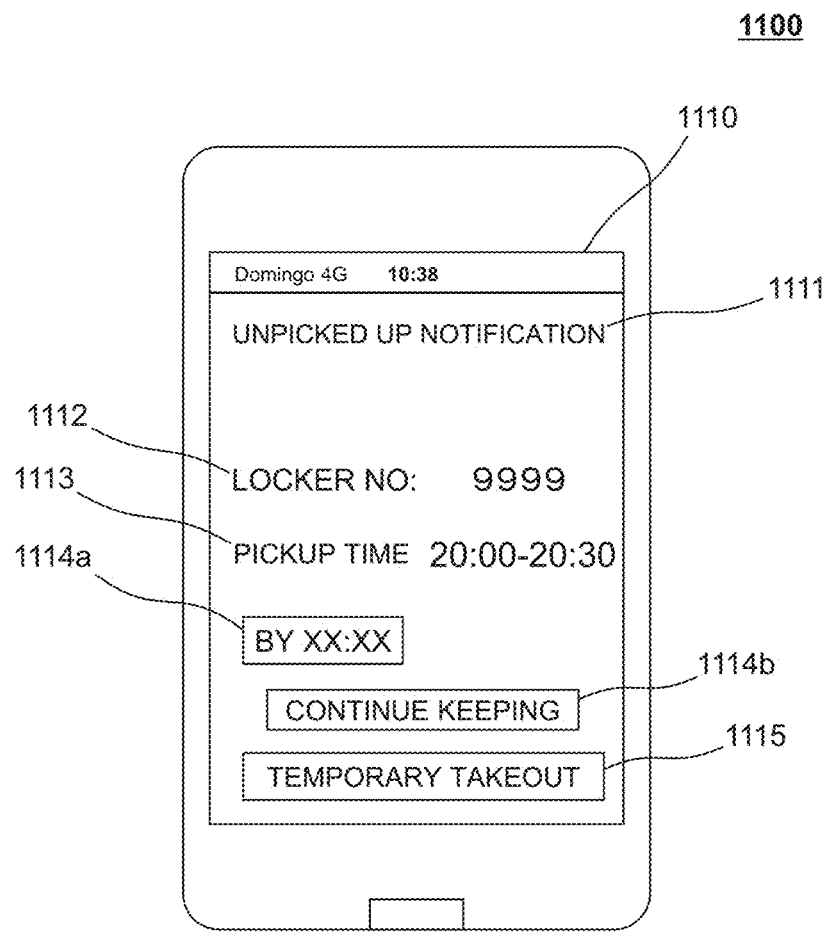
FIG. 11A is an explanatory diagram for explaining an example of presentation on an information processing device (spot terminal or locker spot staff member terminal) related to a locker management system according to one embodiment of the present invention.

In one embodiment of the present invention, if No in Step S814, the management server 31 may notify the spot terminal 202 as shown in FIG. 11A. FIG. 11A is an example of a screen on the spot terminal 1100. The display 1110 of the terminal 1100 shows a title 1111 saying that the item has not been picked up by the designated time, the locker number 1112 of the locker containing the item, and a pick-up time 1113. Here, if the locker (box) can be continuously managed by the management server 31 or the management at the site by extension for a predetermined length of time (for example, the stockable time if the longest possible extension is made, or an extendable time up to that time) which is shown in 1114a, and the command button 1114b for issuing a command for continuous management is pressed. In contrast, if the locker (box) is fully booked after that, or if the spot side decides to temporarily take out the item even if it is not fully booked, the item is supposed to be temporarily taken out of the locker (box) and the temporary takeout button 1115 is pressed.

These operations and statuses can be managed by the management server 31 or the spot side as needed.

In one embodiment, the time displayed in 1114a can be changed by operation by, for example, a staff member without being affected by the subsequent bookings.

If Yes in Step S822, the process proceeds to Step S824, the item is temporarily taken out of the locker (box), and the locker is temporarily opened. These states are managed by the management server 31 and/or the spot (staff) terminal 202. The process then proceeds to Step S828 in which this fact is notified to the user terminal. In Step S823, the user terminal receives this notification.

In one embodiment, the item taken out of the locker (box) in Step S824 is safely kept in another area of the locker spot, and re-designation by the user is waited (the process proceeds to Step S817 upon re-designation by the user).

If No in Step S822, the process proceeds to Step S826, and the item is continuously managed in the locker (box). These states are managed by the management server 31 and/or the spot terminal 202. The process then proceeds to Step S830 in which this fact is notified to the user terminal. In Step S823, the user terminal receives this notification.

Figure 11B:
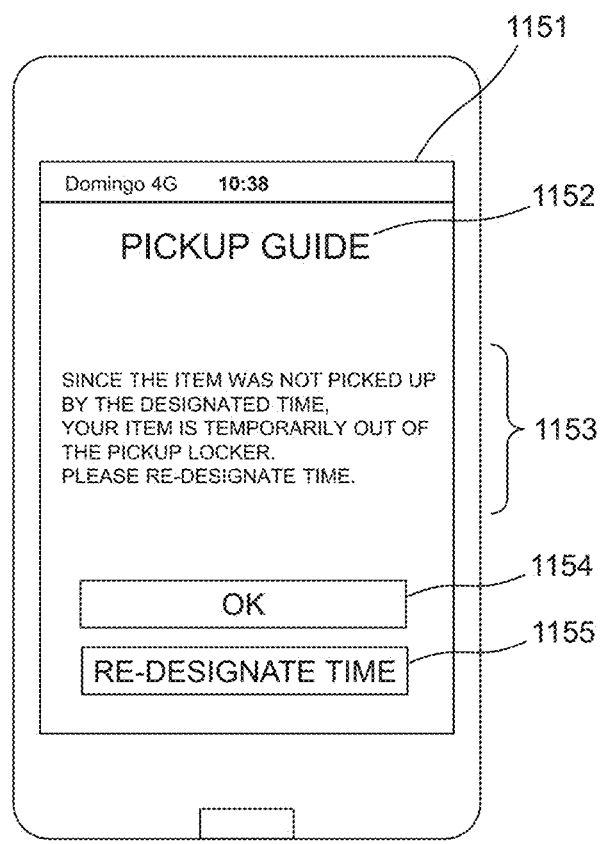
FIG. 11B is an explanatory diagram for explaining another example of presentation on an information processing device (user or customer terminal) related to a locker management system according to one embodiment of the present invention.

FIG. 11B shows an example of a screen that appears when the user terminal receives the temporary item takeout notification (keep notification) in Step S823. FIG. 11B is an example of the screen of the user terminal 1150, and the display 1151 of the terminal 1150 shows a guide message 1152, a temporary item takeout message 1153, a confirmation button 1154, and a re-designation (change command) button 1155. If there is no problem with the displayed guidance, the user presses the confirmation button 1154 (the pickup time will be re-designated later. In this case, the store may remind the user by a notification not shown in the drawing). Meanwhile, if the pick-up time should be reset, pressing the re-designation button (change command) 1155 can cause a transition to a re-designation screen (not shown in the drawing) where the pick-up time can be re-designated or a command for changing the pickup time can be issued.

When the item should be continuously managed, the message "The item was not picked up at the designated time but will continuously be kept in the pickup locker until XX: XX." and a confirmation button may be displayed instead of the screen of FIG. 11B.

After Step S823, the process proceeds to Step S825.

In Step S825, whether the pick-up time has been re-designated by the user is determined. If Yes, the process proceeds to Step S817, the pick-up time re-designation is accepted through the application on the user terminal, and the process returns to Step S810. In Step S825, if No (here, the item is supposed to be continuously managed), the process proceeds to Step S829.

In Step S832, the item is delivered via the locker (locker opening). In Step S829, the user picks up the item via the locker opened.

Next, in Step S834, the completion of delivery is recognized through sign input, terminal operation, automatic reading processing, and the like not shown in the drawing, and the delivery completion notification is transmitted from the store (the spot terminal 202 or management server 31). In Step S831, the user terminal receives this completion notification. An example of the reception screen on the user terminal is as described above with reference to FIG. 12.

(Locker Control by Management Server)

In another embodiment of the present invention, the control of locking/unlocking of the locker can be controlled by the management server. Variations of embodiment in this case will be described with reference to FIGS. 13 and 14. This embodiment is replaced with the embodiment shown in Step S811, Step S812, and Step S819 in FIG. 8.

Further, in this embodiment, two-dimensional information (which contains at least locker number information, and may contain locker spot information, and locker spot location information) items unique to individual locker doors attached to the respective locker doors.

Figure 13:
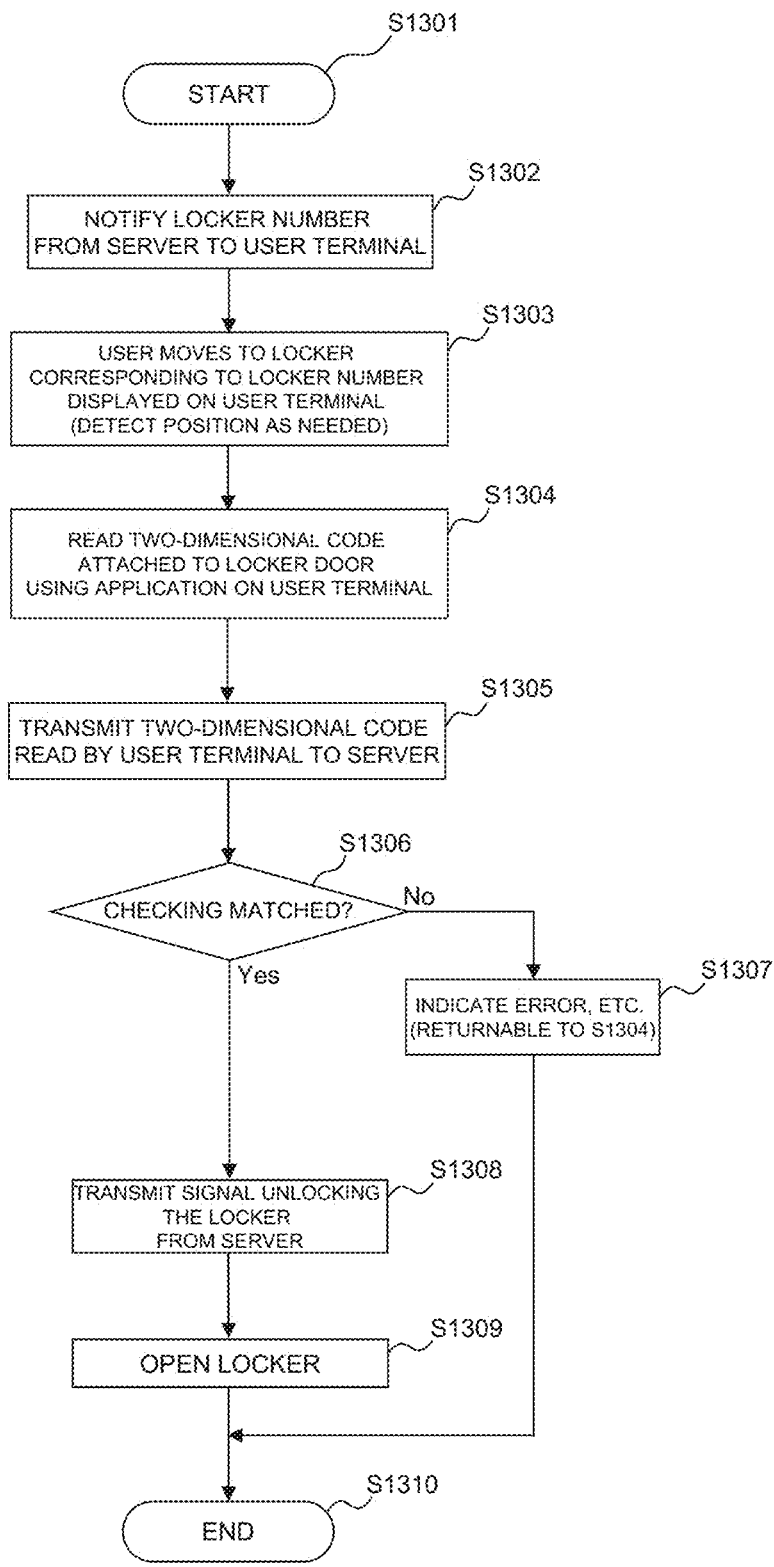
FIG. 13 is an operation processing flow for explaining operation related to a locker management system according to one embodiment of the present invention.

FIG. 13 is an operation flow of locking/unlocking the locker under the control of the management server in another embodiment of the present invention. When the processing is started in Step S1301, the process proceeds to Step S1302, and the locker number assigned by the management server to the user terminal is notified. At this time, the management server manages the following data entries as one embodiment.

TABLE 2

| Membership number (user ID) | Locker spot ID | Locker number | Item keeping time slot | Locker location |
| --- | --- | --- | --- | --- |

Referring to this table, the membership numbers (user ID) are identifiers that can uniquely identify the users. The locker spot IDs are identifiers that can uniquely identify the locker spots, and the locker numbers indicate the individual locker numbers of the lockers at the respective locker spots. The item keeping time slots are time slots in which the notified user's items or the like are stored at the respective locker numbers. The locker locations can be locker spot location information, for example, addresses and latitude and longitude information.

In Step S1303, the user who received the notification in the previous step moves to the locker associated with the locker number displayed on the user terminal. At this time, the position of the user terminal may be detected if necessary.

Figure 14:
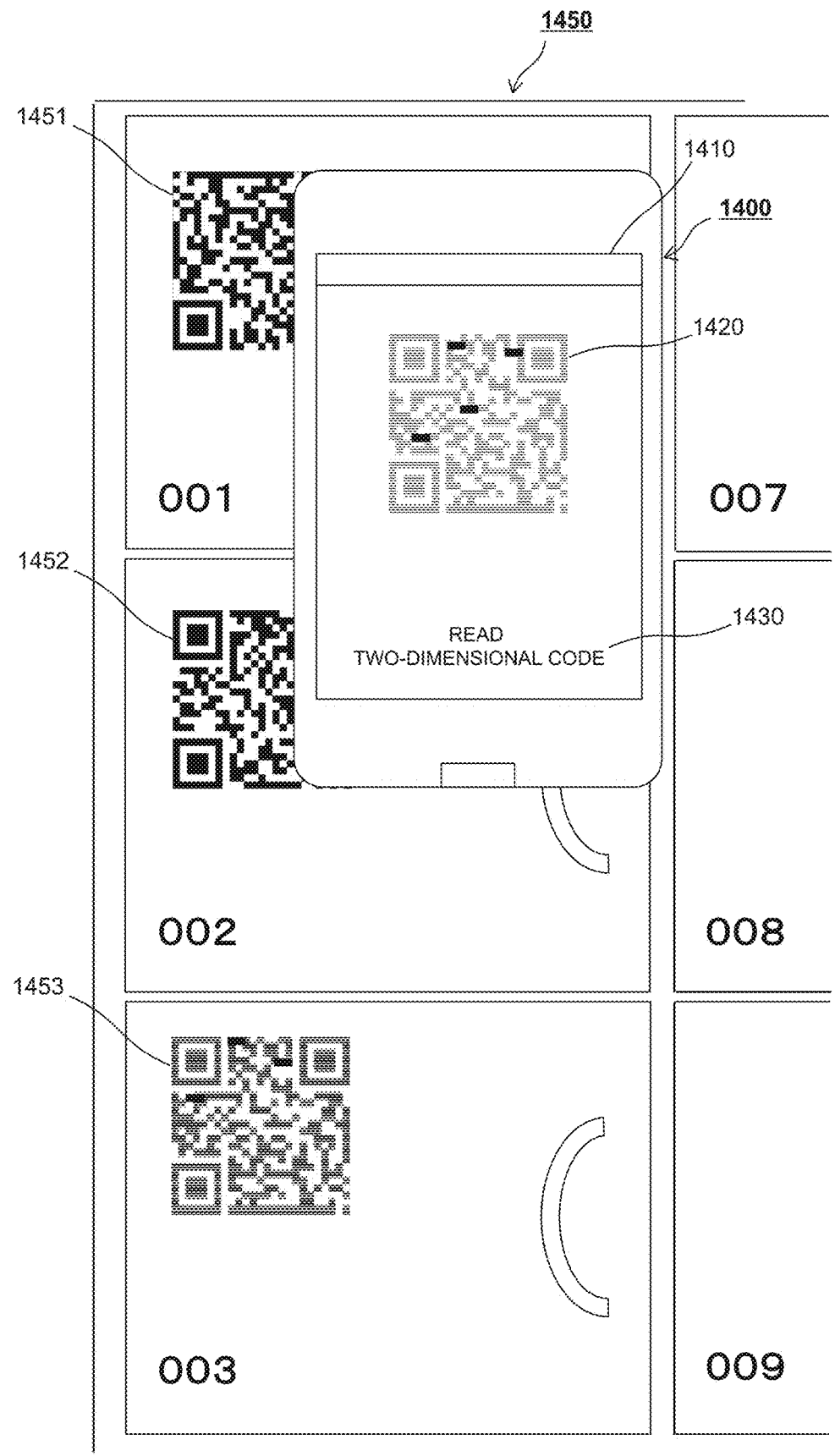
FIG. 14 is an explanatory diagram for explaining an example of presentation on an information processing device (user or customer terminal) related to a locker management system according to one embodiment of the present invention.

In Step S1304 in one embodiment, the user reads an identification code (including a code that can be widely identified as an image, such as a one-dimensional code or a two-dimensional code) attached to the locker door using an application installed on the user terminal. At this time, in one embodiment, as shown in FIG. 14, the screen 1410 of the user terminal 1400 shows the identification code 1451 attached to the door of the locker (in which the user's item is supposed to be) with the locker number 001 of the locker 1450 as the code 1420, information of which is being read (the fact that the user terminal is in the identification code reading mode can be checked through the message 1430).

In Step S1305, the identification code information read in the previous step and the user ID are transmitted from the user terminal to the server. In other embodiments, the current location information may be transmitted from the user terminal to the server.

(Variation of Code Payment or Code Authentication)

The aforementioned steps S1304 and S1305 can be said to be a merchant presented mode (MPM) method for reading a two-dimensional code or an identification code provided at the store. This is not necessarily the case in the present invention, and the consumer presented mode (CPM) method in which the user shows a two-dimensional code or an identification code and has it read by the store (terminal) can also be adopted. In this case, a reader with a camera (not shown in the drawing) built on the locker and configured to be able to communicate with the server can be adopted.

(Still Another Variation)

In still another embodiment of the present invention, besides the aforementioned variations of CPM and MPM method-based code payment and code authentication, payment or authentication via near field wireless communication such as Bluetooth (registered trademark), or payment or authentication via contactless IC chips can be implemented.

In this case, both the locker equipment and the user terminal are equipped with communication means capable of wireless communication according to the same standard or compatible standard.

Returning to FIG. 13 again, in Step S1306, the user ID and identification code information transmitted from the user terminal in the previous step are checked by the management server. In one embodiment, the management server checks the user ID transmitted from the user terminal and the read locker number against the user ID and the locker number which are managed in advance by the management server, although this is not necessarily the case in the present invention.

In another embodiment of the present invention, the current location information transmitted from the user terminal may be checked against the locker location information managed in advance by the management server.

Needless to say, in Step S1306, whether the time at which the identification code information or the like was transmitted from the user terminal in Step S1305 is in the time slot for keeping the item or the like in the locker is checked.

If Yes (if the answer of the checking processing is positive) in Step S1306, the process proceeds to Step S1308. If No (if the answer of the checking processing is negative), the process proceeds to Step S1307 where, for example, an error is displayed, and the operation flow is terminated (Step S1310) or the process may return to Step S1304 where the identification code is reread.

In Step S1308, an unlocking signal is transmitted from the management server to the locker to be checked, and the process then proceeds to Step S1309 where the locker is unlocked.

In one embodiment of the present invention, even if the locker number assigned by the management server to the user terminal is 002 (the identification code 1452 is attached to the door) or 003 (the identification code 1453 is attached to the door), each locker can be unlocked by the same procedure as described above.

Embodiments of a locker management system and the like have been described above based on specific examples; however, an embodiment of the present invention can be, besides a method or program for implementing the system or device, a storage medium containing the program (for example, an optical disk, a magneto-optical disk, a CD-ROM, a CD-R, a CD-RW, a magnetic tape, a hard disk, or a memory card).

The program implementation mode is not limited to an application program such as an object code compiled by an compiler or a program code executed by an interpreter, and may be, for example, a program module incorporated in the operating system.

As for the program, not all the processing is executed only in the CPU on the control board, and if necessary, a part or all of it may be executed by another processing unit (for example, DSP) mounted on the extension board or the extension unit added to the board.

As for all components described herein (including claims, abstract, and drawings) and/or for all steps of all disclosed methods or processing, these features can be used in any combination that is not mutually exclusive.

Each of the features described herein (including claims, abstract, and drawings) can be replaced with an alternative feature that serves for the same purpose, equivalent purpose, or similar purpose, unless expressly denied. Therefore, unless explicitly denied, each of the disclosed features is merely an example of a comprehensive set of same or equal features.

The present invention is not limited to any specific configuration of the aforementioned embodiments. The present invention can be extended to all novel features disclosed herein (including claims, abstracts, and drawings) or combinations thereof, or all novel methods or processing steps disclosed herein or combinations thereof.

REFERENCE SIGNS LIST

10 Locker management system
11-13 Distribution center
14-16 Locker spot
201 Electronically controlled locker
202 Spot (staff) terminal
204 Package keeping area
30 Locker management system
31 Management server
32 Tablet device (one mode of user terminal device)
33 Mobile phone (one mode of user terminal device)

34-36 PC (one mode of user terminal device or spot terminal)
37-38 POS terminal (one mode of spot terminal or mobile terminal during shipping)
47a-47c, 48 Communication line
49 Public line (e.g., private line of Internet)

What is claimed is:

1. A locker management system comprising:
a management server that manages a status of shipping of items from one or more distribution centers to a plurality of locker spots, and a status of keeping each of the items at each of the locker spots for a predetermined length of time, wherein
the locker spot is equipped with an electronically controlled locker for keeping the item, and a spot terminal, and
the management server
  receives selection and designation of the locker spot to keep the item from a customer terminal and designation of the predetermined length of time for which the item is kept at the locker spot,
  upon delivery of the item to the electronically controlled locker of the locker spot selected and designated by the customer terminal, notifies the customer terminal of a locker number in the electronically controlled locker keeping the item, and manages the locker number, a customer ID of the customer, and the predetermined length of time,
  when a customer using the customer terminal visits the locker spot during the managed predetermined length of time, and in order to unlock the locker corresponding to the locker number using the customer terminal, reads an identification code attached to the locker and transmits the identification code and the customer ID of the customer to the management server, performs processing of checking the locker number notified to the customer terminal for takeout of the item kept in the locker corresponding to the locker number in the electronically controlled locker, and a customer ID corresponding to the locker number managed by the management server against the locker number transmitted from the customer terminal, and the customer ID of the customer, and if the answer of the checking processing is positive, transmits a signal for unlocking the locker corresponding to the locker number from the management server to the locker,
    when the customer using the customer terminal does not visit the locker spot during the managed predetermined length of time and does not unlock the locker corresponding to the locker number using the customer terminal,
      determines that the customer has not visited the locker spot during the managed predetermined length of time, and whether or not the locker spot can be used continuously after the managed predetermined length of time by referring to a subsequent booking that has been set,
  when the locker spot can be used continuously because of no subsequent booking,
    transmits an inquiry to the customer terminal, the inquiry including a first selection that the item kept in the locker corresponding to the locker number in the electronically controlled locker should be temporarily taken out, and a second selection that the item should be continuously kept in the locker for a stockable length of time as an extension,
    receives a response to the inquiry from the customer terminal, the response including one of the first selection and the second selection, and
    processes to temporarily take out the item in the locker corresponding to the locker number in the electronically controlled locker when the response including the first selection is received, and
    processes to continuously keep the item in the locker for the stockable length of time when the response including the second selection is received,
  when the locker sport cannot be used continuously because of the subsequent booking,
    transmits another inquiry to the customer terminal, the another inquiry including a notice that the item kept in the locker corresponding to the locker number in the electronically controlled locker should be temporarily taken out, and requesting the user to re-design a new time period to keep the item in the locker spot so that a re-designation of the new time period is transmitted to the management server, and the management server updates the status of keeping item in response with the re-designation.

2. The locker management system according to claim 1, wherein the management server is a spot terminal installed at the locker spot.

3. The locker management system according to claim 1, wherein the management server receives a command for changing the predetermined length of time from the customer terminal.

4. A method executed in a locker management system comprising a management server that manages a status of shipping of items from one or more distribution centers to a plurality of locker spots, and a status of keeping each of the items at each of the locker spots for a predetermined length of time, wherein the locker spot is equipped with an electronically controlled locker for keeping the item, and a spot terminal, the method causing the management server to perform:
  the step of receiving selection and designation of the locker spot to keep the item from a customer terminal and designation of the predetermined length of time for which the item is kept at the locker spot,
  the step of, upon delivery of the item to the electronically controlled locker of the locker spot selected and designated by the customer terminal, notifying the customer terminal of a locker number in the electronically controlled locker keeping the item, and managing the locker number, a customer ID of the customer, and the predetermined length of time,
  the step of, when a customer using the customer terminal visits the locker spot during the managed predetermined length of time, and in order to unlock the locker corresponding to the locker number using the customer terminal, reads an identification code attached to the locker and transmits the identification code and the customer ID of the customer to the management server, performing processing of checking the locker number notified to the customer terminal for takeout of the item kept in the locker corresponding to the locker number in the electronically controlled locker, and a customer ID corresponding to the locker number managed by the management server against the locker number transmitted from the customer terminal, and the customer ID of the customer, and if the answer of the checking processing is positive, transmitting a signal for unlocking the locker corresponding to the locker number from the management server to the locker, and the step of, when the customer using the customer terminal does not visit the locker spot during the managed predetermined length of time and does not unlock the locker corresponding to the locker number using the customer terminal, determining that the customer has not visited the locker spot during the managed predetermined length of time, and whether or not the locker spot can be used continuously after the managed predetermined length of time by referring to a subsequent booking that has been set, when the locker spot can be used continuously because of no subsequent booking, transmitting an inquiry to the customer terminal, the inquiry including a first selection that the item kept in the locker corresponding to the locker number in the electronically controlled locker should be temporarily taken out, and a second selection that the item should be continuously kept in the locker for a stockable length of time of as an extension, receiving a response to the inquiry from the customer terminal, the responding including one of the first selection and the second selection, and processing to temporarily take out the item in the locker corresponding to the locker number in the electronically controlled locker when the response including the first selection is received, and processing to continuously keep the item in the locker for the stockable length of time when the response including the second selection is received, when the locker sport cannot be used continuously because of the subsequent booking, transmitting another inquiry to the customer terminal, the another inquiry including a notice that the item kept in the locker corresponding to the locker number in the electronically controlled locker should be temporarily taken out, and requesting the user to re-design a new time period to keep the item in the locker spot so that a re-designation of the new time period is transmitted to the management server, and the management server updates the status of keeping item in response with the re-designation.

5. The method according to claim 4, wherein the management server is a spot terminal installed at the locker spot.

6. The method according to claim 4, further forcing the management server to perform the step of receiving a command for changing the predetermined length of time from the customer terminal.

* * * * *